(12) United States Patent
Allwein

(10) Patent No.: US 7,243,484 B2
(45) Date of Patent: Jul. 17, 2007

(54) APPARATUS AND METHOD FOR LOADING A PACKAGING STATION OF AN INSULATION BATT PACKAGER

(75) Inventor: Robert J. Allwein, Nicholson, GA (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 11/649,516

(22) Filed: Jan. 4, 2007

(65) Prior Publication Data
US 2007/0107386 A1    May 17, 2007

Related U.S. Application Data

(62) Division of application No. 11/159,744, filed on Jun. 23, 2005, now abandoned.

(51) Int. Cl.
*B65B 13/20* (2006.01)
(52) U.S. Cl. .............................. 53/529; 53/438; 198/347
(58) Field of Classification Search ................... 53/436, 53/438, 439, 523, 526, 527, 528, 529; 198/347.1, 198/347.2, 347.3, 347.4, 604, 607, 726
See application file for complete search history.

(56) References Cited

U.S. PATENT DOCUMENTS

| | | | |
|---|---|---|---|
| 2,374,429 A | 4/1945 | Hayes et al. | |
| 3,124,231 A | 3/1964 | Ott, Jr. | |
| 3,754,632 A | 8/1973 | Kruetter | |
| 3,824,759 A | 7/1974 | Finn et al. | |
| 3,926,299 A | 12/1975 | Bradley | |
| 4,074,508 A | 2/1978 | Reid | |
| 4,094,130 A | 6/1978 | Kelly et al. | |
| 4,170,285 A | 10/1979 | Hinchcliffe | |
| 4,220,236 A | 9/1980 | Blidung et al. | |
| 4,273,234 A | 6/1981 | Bourgeois | |
| 4,328,655 A | 5/1982 | Spencer et al. | |
| 4,408,438 A | 10/1983 | Rewitzer | |
| 4,501,107 A | 2/1985 | Piotrowski | |
| 4,805,383 A * | 2/1989 | Allwein | 53/528 |
| 5,113,992 A | 5/1992 | Sadamori | |
| 5,353,576 A | 10/1994 | Palamides et al. | |
| 5,437,144 A | 8/1995 | Akiyama et al. | |
| 6,931,823 B2 | 8/2005 | Forte et al. | |
| 2005/0044815 A1 | 3/2005 | Forte et al. | |

* cited by examiner

*Primary Examiner*—Louis Huynh
(74) *Attorney, Agent, or Firm*—Robert D. Touslee; Timothy G. Hofmeyer

(57) ABSTRACT

An apparatus and method for loading insulation batts into a packaging station of a batt-packaging machine includes: an up-stacking station for receiving a plurality of the insulation batts to form a vertical stack of the insulation batts; a staging station from which the insulation batts are elevated into the up-stacking station of the batt-packaging machine; batt engaging members of a first endless conveyor on the first side of the staging station for successively feeding batts into the staging station; batt engaging members of a second endless conveyor on the second side of the staging station for successively engaging the bottom major surfaces of the insulation batts as the insulation batts are successively fed into the staging station and in cooperation with the batt engaging members of the first endless conveyor for vertically raising the insulation batts from the staging station into the up-stacking station.

16 Claims, 11 Drawing Sheets

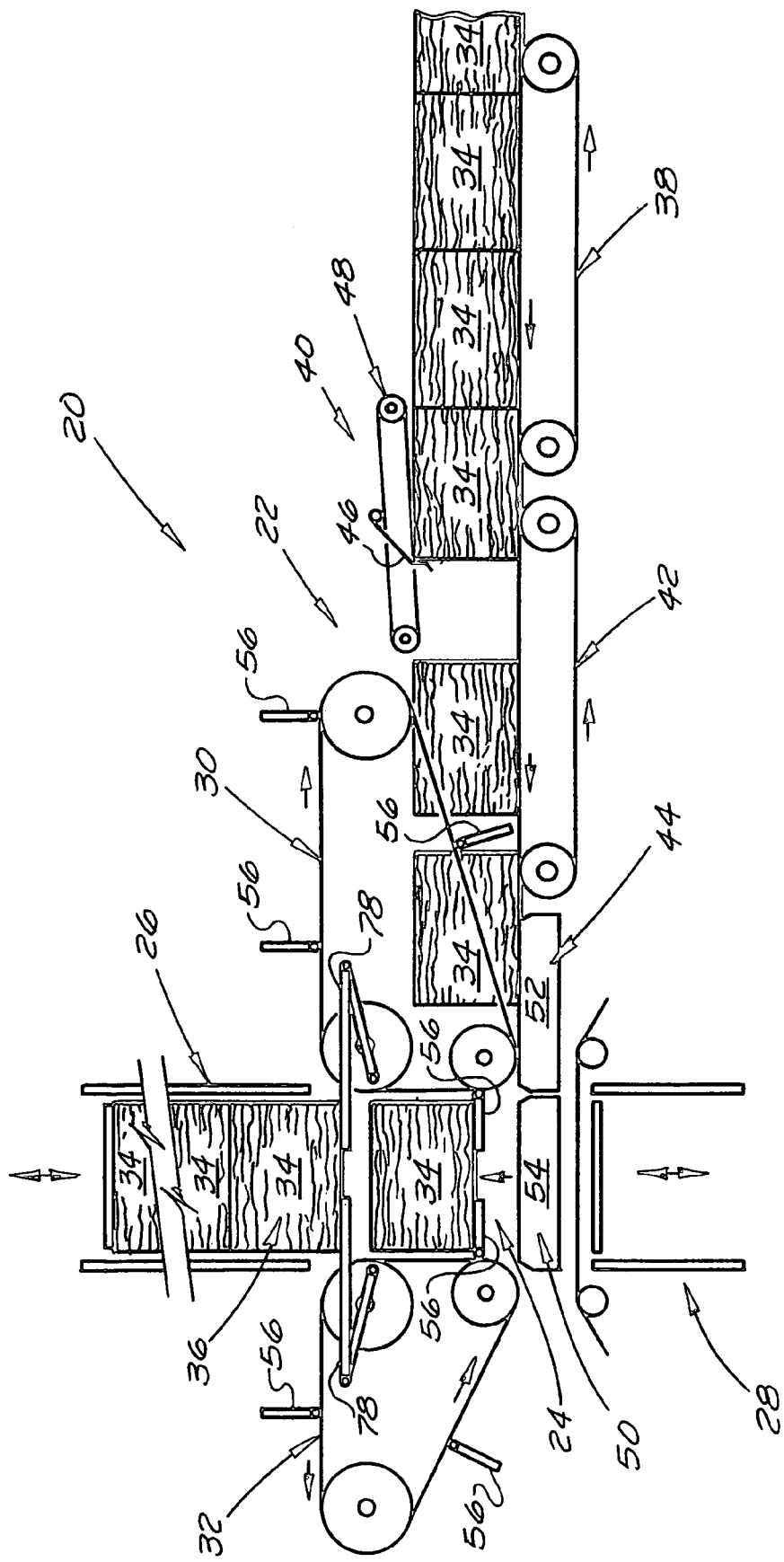

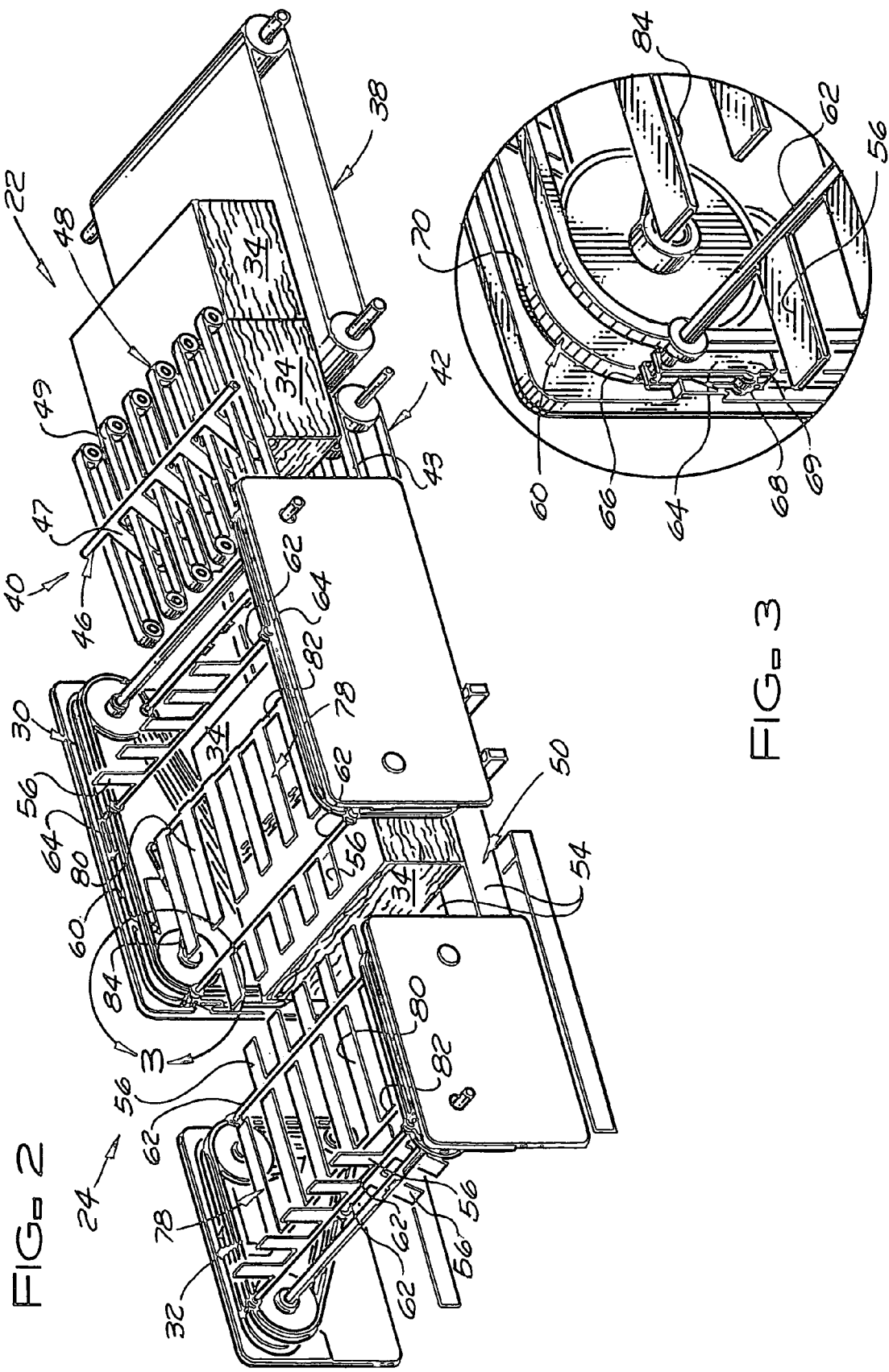

APPARATUS AND METHOD FOR LOADING A PACKAGING STATION OF AN INSULATION BATT PACKAGER

This Application is a DIV of U.S. application Ser. No. 11/159,744, filed Jun. 23, 2005 now abandoned.

BACKGROUND OF THE INVENTION

The subject invention relates to an insulation batt-packaging machine and, in particular, to an improved, versatile, high-speed apparatus and method of loading insulation batts into a packaging station of a batt-packaging machine, a batt-packaging machine incorporating such an apparatus, and the method of utilizing such an apparatus for loading insulation batts into a packaging station of a packaging machine. The apparatus and method of the subject invention are especially well suited for economically, efficiently, and rapidly delivering unfolded and single-fold insulation batts into the loading station of an insulation batt-packaging machine.

Faced and unfaced fiberglass insulation batts are currently produced and packaged in unfolded and single-fold insulation batt form on high capacity production lines. Typically, these high capacity production lines each include a high capacity fiberglass insulation batt manufacturing operation that produces the fiberglass insulation batts, ready for packaging, as batts in unfolded or single-fold form and a packaging operation for packaging the insulation batts in packages that contain between two and twelve compressed batts per package. For sales to builders and commercial insulation contractors, the fiberglass insulation batts are commonly sold in a package containing between four and sixteen compressed batts. The shorter length batts (e.g. batts about four feet in length) are typically packaged in an unfolded condition. The longer batts (e.g. batts about eight feet in length) are typically folded in half so that the length of the package containing the batts approximates one-half of the length of the batts within the package (e.g. about four feet)

Current packaging operations may use a batt-packaging machine and method, such as that disclosed in U.S. Pat. No. 4,805,383, issued Feb. 21, 1989, that up-stacks unfolded or single-fold insulation batts into an up-stacking station of the packaging machine to form a vertical stack of the insulation batts. This stack of insulation batts is then delivered to a packaging station of the packaging machine where the stack of insulation batts is compressed and packaged. As shown in U.S. Pat. No. 4,805,383, this type of batt-packaging machine currently utilizes a reciprocating loader mechanism to individually up-stack insulation batts into an up-stacking station of the packaging machine and form the vertical stack of the insulation batts. This vertical stack of insulation batts is then delivered to the packaging station of the machine. To load each individual insulation batt into the up-stacking station of the packaging machine and form the vertical stack of insulation batts, the current reciprocating loader mechanism cycles through a loading stroke and a return stroke. While the return stroke of this reciprocating loader mechanism cycle may be somewhat faster than the loading stroke, in general, the need for the reciprocating loader mechanism to return to its initial position before the up-stacking of the next insulation batt can commence causes a pause in the batt up-stacking operation and essentially doubles the loading time for each batt loading cycle. Thus, there has remained a need for an apparatus and method for use in such packaging machines that enables the continuous or substantially continuous loading of insulation batts into an up-stacking station of the packaging machine to thereby essentially reduce by half the time for forming a stack of insulation batts in the up-stacking station. The apparatus and method of the subject invention provide for the continuous up-stacking of insulation batts into the up-stacking station of such a packaging machine and thereby essentially reduce the up-stacking time of the packaging operation by half. By replacing the up-stacking apparatus and method currently used in packaging machines of the type disclosed in U.S. Pat. No. 4,805,383 with the up-stacking apparatus and method of the subject invention, packaging machines of the type disclosed in U.S. Pat. No. 4,805,383 will easily accommodate the production capacities of current fiberglass insulation batt production lines and other insulation batt production lines as well as increased production line capacities for these and other insulation batt production lines.

SUMMARY OF THE INVENTION

The apparatus of the subject invention for loading insulation batts into a packaging station of a batt-packaging machine of the subject invention includes an up-stacking station with an up-stacking chamber for receiving a plurality of the insulation batts to form a vertical stack of the insulation batts; a staging station from which the insulation batts are elevated into the up-stacking station of the batt-packaging machine; a first endless conveyor assembly on a first side of the staging station that has a vertical run forming a first side of the staging station; and a second endless conveyor assembly on a second side the staging station that has a vertical run spaced from the vertical run of the first endless conveyor and forming a second side of the staging station.

The first endless conveyor assembly has a lower batt infeed run, the vertical or substantially vertical run that extends upward from the infeed run and forms the first side of the staging station, and an upper return run. The second endless conveyor assembly has a lower run, the vertical or substantially vertical run that extends upward from the lower run and forms the second side of the staging station, and an upper return run. The first and second endless conveyor assemblies each have batt engaging blades.

Then, during their infeed run, the batt engaging blades on the first endless conveyor assembly successively engage and convey the insulation batts toward and into the staging station with the insulation batts oriented to have their longitudinal centerlines extending in a direction transverse to the direction in which the insulation batts are being conveyed by the first endless conveyor assembly. In the staging station, the batt engaging blades of both the first and second endless conveyor assemblies successively extend into the staging station from the first and second sides of the staging station, successively engage the bottom major surfaces of the insulation batts as the insulation batts are successively fed into the staging station by the first endless conveyor assembly; and cooperate with each other as the batt engaging blades move upwardly in the vertical runs of the first and second endless conveyor assemblies to successively raise the insulation batts from the staging station into the up-stacking station of the batt-packaging machine. Thus, unlike batt up-stacking mechanisms of the type disclosed in U.S. Pat. No. 4,805,383, which intermittently feed the insulation batts into the up-stacking station of the batt-packaging machine, the batt stacking mechanism of the subject invention continuously feeds the insulation batts to form a vertical stack of the insulation batts for subsequent packaging in the packaging station of the batt-packaging machine and essentially cuts the up-stacking time of the packaging operation by half.

Once a stack containing the selected number of insulation batts is formed, the up-stacking of insulation batts is temporarily paused and the stack of insulation batts is moved from the up-stacking and staging stations down into the packaging station by a compression plate where the packaging of the stack of insulation batts is completed. An apparatus for delivering a stack of insulation batts from the up-stacking and staging stations into the packaging station of the batt-packaging machine and completing the packaging of the insulation batts in the packaging station, of the type disclosed in U.S. Pat. No. 4,805,383, may be used with the apparatus and method of the subject invention to move stacks of insulation batts from the up-stacking and staging stations into the packaging station and compete the packaging of the insulation batts in the packaging station. The disclosure of U.S. Pat. No. 4,805,383, issued Feb. 21, 1989, inventor Robert J. Allwein, is hereby incorporated herein in its entirety by reference.

BRIEF DESCRIPTION OF THE DRAWINGS

FIG. 1 is a schematic side elevation view of an insulation batt-packaging machine of the subject invention incorporating the infeed, staging, and up-stacking stations of the packaging station batt loading apparatus of the subject invention.

FIG. 2 is a schematic perspective view of a preferred embodiment of the infeed and staging stations of the packaging station batt loading apparatus of the subject invention.

FIG. 3 shows the circled portion of FIG. 2 in a larger scale.

DESCRIPTION OF THE PREFERRED EMBODIMENTS

Figure 4:
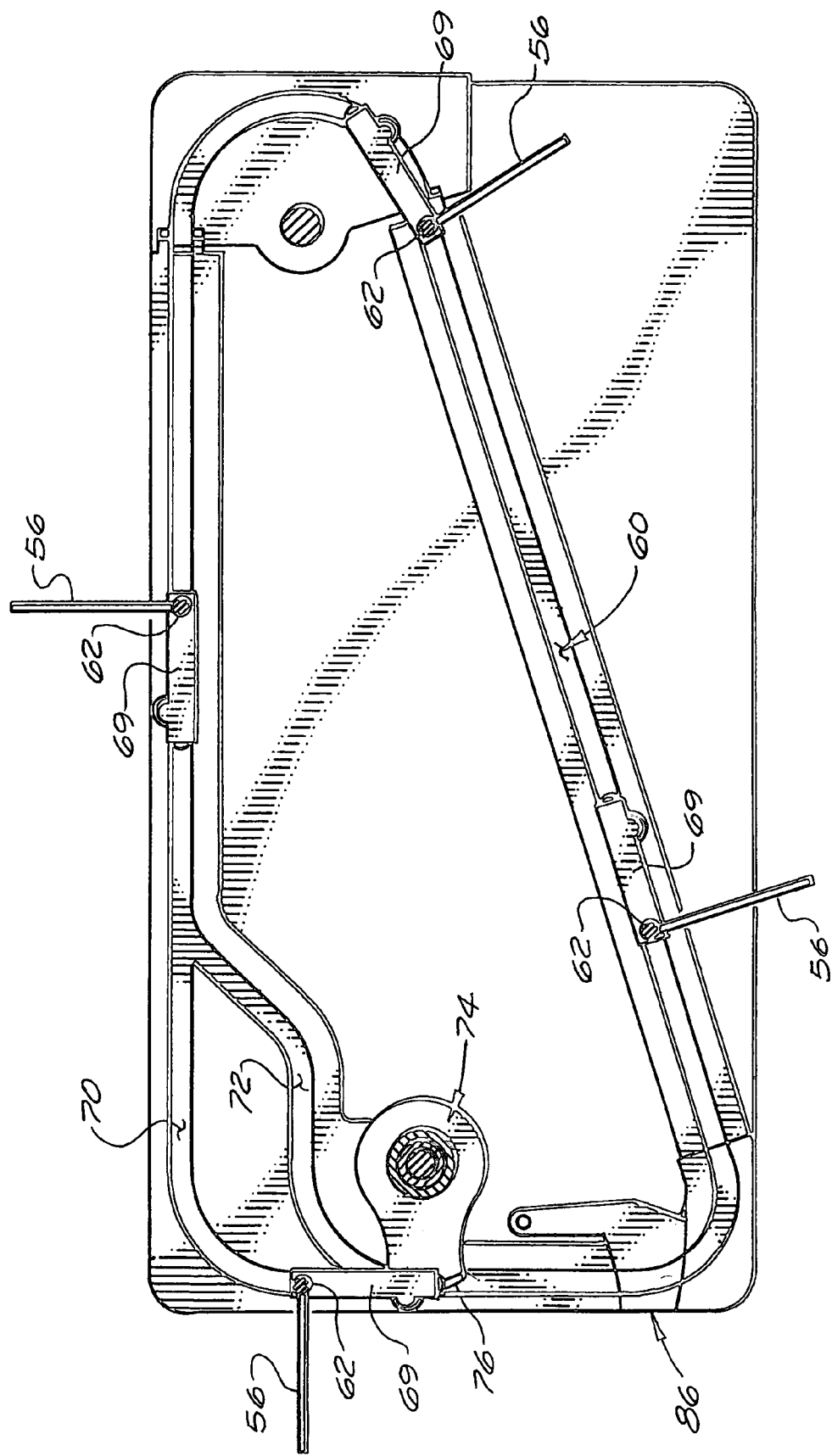
FIG. 4 is a schematic side elevation view of one of the continuous cam tracks of the infeed and staging stations of FIG. 2.

As shown in FIG. 1, the packaging machine 20 of the subject invention includes an infeed station 22, a staging station 24, an up-stacking station 26, a packaging station 28, a first endless conveyor assembly 30, and a second endless conveyor assembly 32. The first endless conveyor assembly 30 forms part of the infeed station 22 and the staging station 24. The second endless conveyor assembly forms part of the staging station. Insulation batts 34, in unfolded or single-fold form, are fed through the infeed station 22 into the staging station 24. In the staging station 24 the first and second endless conveyor assemblies 30 and 32 cooperate to raise the insulation batts 34 from the staging station into a stacking chamber of the up-stacking station 26 where a stack of insulation batts is formed. Once a stack of insulation batts, that includes an insulation batt located in the staging station 24 is formed, the stack 36 of insulation batts is transferred from the staging and up-stacking stations 24 and 26 into the packaging station 28 where the packaging of the stack 36 of insulation batts is completed.

As shown in FIGS. 1 and 2, the infeed station 22, in addition to the first endless conveyor assembly 30, includes a first endless infeed conveyor 38; a modulator gate assembly 40; a second endless infeed conveyor 42 formed by a series of endless belts 43 that are spaced apart from each other across the width of the infeed station; and a slideway 44. The first endless infeed conveyor 38 conveys insulation batts 34 from a production line (not shown) to the packaging machine 20 where the insulation batts 34 are successively brought into contact with the modulator gate 46 of the modular gate assembly 40. The modular gate 46 of the modular gate assembly 40 is formed by a series of gate blade arms 47 that are spaced apart from each other across the width of the infeed station. The modular gate assembly 40 is controlled by a conventional control system to coordinate the downstream feed of insulation batts 34 by the second endless infeed conveyor 42 with the first endless conveyor assembly 30 for the completion of the infeed of the insulation batts 34 into the staging station 24. The modular gate assembly 40 accomplishes this function by simultaneously pivoting the gate blade arms 47 of the modulator gate 46 upward and actuating a third endless infeed conveyor 48 so that the insulation batts 34 are successively fed, one at a time, downstream by the third endless infeed conveyor 48. The third endless infeed conveyor 48 includes a series of belts 49 that are spaced apart from each other across the width of the infeed station so that the gate blade arms 47 of the modular gate 46 can pass up through the third endless infeed conveyor when an insulation batt 34 is being released from the modulator gate assembly 40. Once fed downstream by the third endless infeed conveyor 48, the insulation batt 34 is picked up by the second endless infeed conveyor 42 and conveyed by the second endless infeed conveyor to the slideway 44. Once an insulation batt 34 has been metered past the modulator gate 46, the gate blade arms 47 of the modulator gate 46 are pivoted back down to their original position to hold back the following insulation batts and the third endless infeed conveyor 48 is stopped. When it is time for the next insulation batt 34 to be fed onto the second endless infeed conveyor 42, the metering cycle just described is repeated.

The slideway 44 of the infeed station 22, as well as a staging platform 50 of the staging station 24 are each made of vertically oriented slats 52 and 54 respectively. The vertically oriented slats 52 of the slideway 44 are spaced apart from each other across the width of the infeed station 22 and the vertically oriented slats 54 of the staging platform 50 are spaced apart from each other across the width of the staging station 24. The slideway 44 of the infeed station 22 is fixed in place. The staging platform 50 of the staging station 24 is movable from a first position (shown in FIGS. 1 and 2) where the staging platform receives incoming insulation batts 34 from the infeed station 22 to a second retracted position where the absence of the staging platform 50 leaves the bottom of the staging station 24 open for the transfer of a stack of insulation batts 36 from the staging and up-stacking stations into the packaging station 28.

The first endless conveyor assembly 30 has a lower batt infeed run, the vertical or substantially vertical run that extends upward from the infeed run and forms a first side of the staging station 24, and an upper return run. The second endless conveyor assembly 32 has a lower run, a vertical or substantially vertical run that extends upward from the lower run and forms a second side of the staging station 24, and an upper return run. The first and second endless conveyors assemblies 30 and 32 each have sets of batt engaging blades 56. The batt engaging blades 56 of the first endless conveyor assembly 30 are spaced apart from each other across the width of the first endless conveyor assembly 30 so that the blades 56 of each set of blades can pass between the belts 49 of the third endless infeed conveyor 48, the belts 43 of the second endless infeed conveyor 42, the slats 52 of the slideway 44, and the slats 54 of the staging platform 50. The batt engaging blades 56 of the second endless conveyor assembly 32 are spaced apart from each other across the width of the second endless conveyor assembly 32 so that the blades 56 of each set of blades can pass between the slats 54 of the staging platform 50.

As shown in FIGS. 1 and 2, the first endless conveyor assembly 30 has four sets of batt engaging blades 56 and the second endless conveyor assembly 32 has three sets of batt engaging blades 56. Since, except for their different lengths and sets of batt engaging blades 56, the first endless conveyor assembly 30 and the second endless conveyor assembly 32 are and function the same, only the first endless conveyor assembly 30 will be described in detail. However, it is to be understood that this detailed description of the first endless conveyor assembly 30 also applies the second endless conveyor assembly 32.

The first endless conveyor assembly 30 includes first and second lateral endless cam tracks 60 that define a path of travel for the first endless conveyor assembly 30. FIG. 4 shows the lateral endless cam track 60 that is located on the left side of the infeed and staging stations 22 and 24 of the apparatus as shown in FIG. 2. The other lateral endless cam track 60 of the first endless conveyor assembly 30, which cannot be seen in FIG. 2, is the mirror image of the lateral endless cam track shown and functions in the same manner as the lateral endless cam track 60.

As shown in FIG. 2, the insulation batts 34 are fed in a first direction through the infeed station 22 into the staging station 24. The first and second lateral endless cam tracks 60 of the first endless conveyor assembly 30 are spaced from each other in a second direction that is perpendicular to the first direction a distance greater than the lengths of the insulation batts 34 in unfolded or folded form. This transverse spacing of the first and second endless cam tracks 60 is sufficiently great to enable the insulation batts 34, in unfolded or folded form, to be conveyed through the infeed station 22 into the staging station 24 with the longitudinal centerlines of the insulation batts oriented perpendicular to the direction of travel of the insulation batts 34.

As shown in FIGS. 2 to 4, the transversely spaced apart batt engaging blades 56 of each set of batt engaging blades of the first endless conveyor 30 are affixed to and extend radially out from a cross member support rod 62. Each cross member support rod 62 extends in the second direction and between the lateral endless cam tracks 60. With the batt engaging blades 56 of each set of batt engaging blades affixed to and extending radially out from one of the cross member support rods 62, when a cross member support rod 62 is angularly displaced about its longitudinal axis, the batt engaging blades 56 affixed to that cross member support rod will likewise be angularly displaced about the longitudinal axis of that cross member support rod.

Each cross member support rod 62 has a first cam member 64 at a first end of the cross member support rod 62 that is engaged with and travels in the first lateral endless cam track 60 of the first endless conveyor assembly 30 and a second cam member 64 at the second end of the cross member support rod 62 that is engaged with and travels in the second endless cam track 60 of the first endless conveyor assembly 30. The first and second cam members 64 cooperate with the first and second lateral cam tracks 60 of the endless conveyor assembly 30 in the same way. Accordingly, only the cooperative operation of the first cam member 64 with the first lateral cam track 60 will be discussed in detail. However, it is to be understood that this detailed description of the cooperative operation of the first cam member 64 with the first lateral cam track 60 of the first endless conveyor assembly 30 also applies the cooperative operation of the second cam member 64 with the second lateral cam track 60 of the first endless conveyor assembly 30.

The first cam member 64 has a leading cam track follower 66 and a trailing cam track follower 68 that are each engaged with and travel in the first lateral endless cam track 60. The leading cam track follower 66 of the first cam member 64 is axially aligned with or substantially axially aligned with the longitudinal axis of the cross member support rod 62. The trailing cam track follower 68 of the first cam member 64 is mounted on an arm 69 of the first cam member, which extends radially out from the cross member support rod 62, at a location that is spaced radially outward from the longitudinal axis of the cross member support rod.

Figure 5:
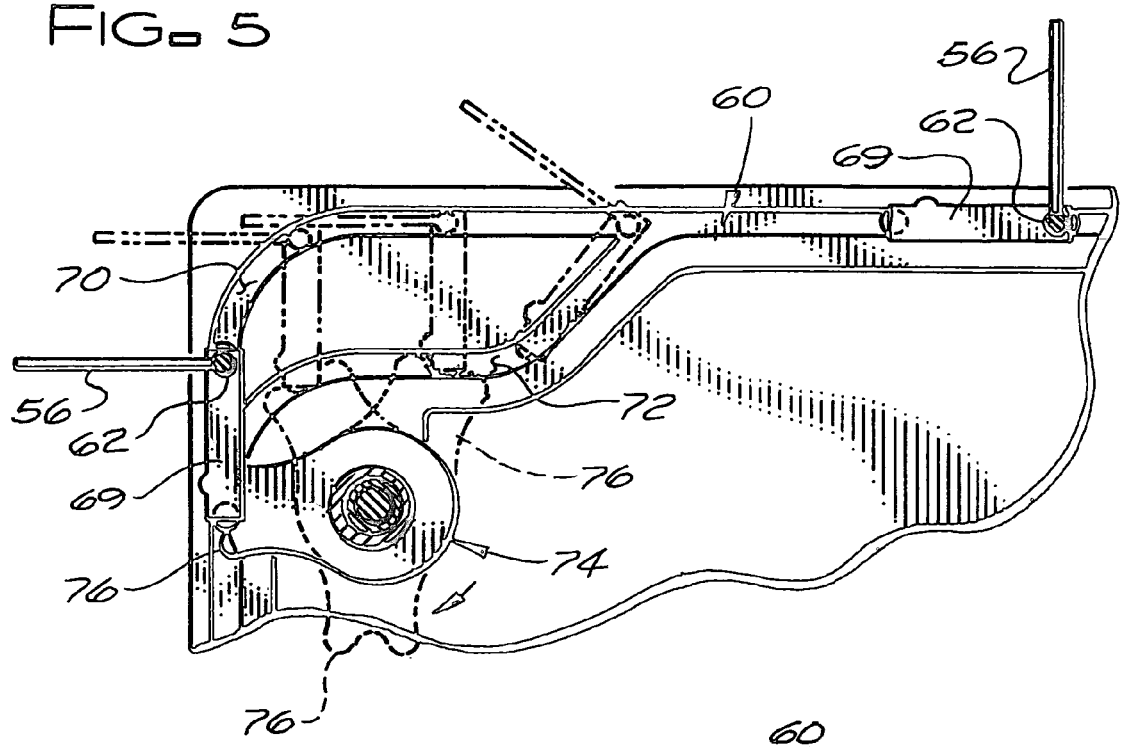
FIG. 5 is a schematic side elevation view of a portion of the continuous cam track of FIG. 4 to better show the mechanism for withdrawing the batt engaging blades of the apparatus in a generally horizontal direction from beneath an insulation batt as the batt is moved from the staging station into the up-stacking station of the apparatus.

As best shown in FIGS. 4 and 5, the first lateral endless cam track 60 of the first endless conveyor assembly 30 diverges from a single track into upper and lower vertically spaced apart track segments 70 and 72 adjacent an upper end of the vertical run of the first lateral endless conveyor assembly 30 and converges in the upper return run of the first lateral endless cam track 60 into the single track. The leading cam track follower 66 of the first cam member 64 of each cross member support rod 62 of the first lateral endless conveyor assembly 30 enters and travels through the upper track segment 70 of the first lateral endless cam track. However, the trailing cam track follower 68 of the first cam member of each cross member support rod 62 of the first lateral endless conveyor 30 is engaged by and diverted into the lower track segment 72 of the first lateral endless cam track 60 by a transfer mechanism 74. The transfer mechanism 74 is mounted on a drive axle and includes a yoke 76 at its outer end for engaging the trailing cam track follower 68. As shown in FIG. 5, after the leading cam track follower passes, the transfer mechanism 74 is rotated from an initial retracted position (shown in phantom line) up and into engagement with the trailing cam track follower 68. Once the yoke 76 of the transfer mechanism 74 engages the trailing cam track follower 68, the transfer mechanism 74 continues to rotate, guides the trailing cam track follower 68 into the lower track segment 72, and moves the trailing cam track follower 68 part of the way through of its passage through the lower track segment 72 before disengaging. The transfer mechanism 74 moves the trailing cam track follower 68 through the first portion of the lower cam track segment 72 so that the trailing cam track follower 68 remains directly below or substantially directly below the leading cam track follower 66 as it passes through the upper cam tack segment 70 until the batt engaging blades 56 of mounted on the cross member support rod 62 are withdrawn or substantially withdrawn from the staging station 24. With the trailing cam track follower 68 being maintained directly below or substantially directly below the leading cam track follower 66 until the batt engaging blades 56 are withdrawn or substantially withdrawn from the staging station 24, the batt engaging blades 56 rather than pivoting from a generally horizontal orientation to a generally vertical orientation as the leading cam track follower 66 passes from the vertical run to the upper return run of the first endless conveyor assembly 30 is withdrawn in a horizontal or substantially horizontal direction from the staging station 24. Once the transfer mechanism 74 is disengaged from a trailing cam track follower 68, the trailing cam track follower 68 moves upward and behind the leading cam track follower 66 as the upper and lower cam track segments 70 and 72 converge to rotate the batt engaging blades 56 from a generally horizontal to the generally vertical orientation and the transfer mechanism 74 is returned to its initial retracted position where the transfer mechanism 74 stays until the transfer mechanism is again activated to bring the transfer mechanism 74 into engagement with the next trailing cam track follower and the operation is repeated. By withdrawing the batt engaging blades 56 from the staging station 24 in a generally horizontal orientation rather than by pivoting the batt engaging blades 56 out of the staging station, the free edges of the batt engaging blades 56 are not drawn across the bottom edge portions of the insulation batts 34 where the batt engaging blade edge could damage the insulation batts and the insulation batts 34 are easily transferred from being supported by the batt engaging blades 56 to being supported by the escapement assemblies 78.

As shown in FIG. 2, the escapement assemblies 78 each include a series of batt support blades 80, a support blade cross member 82, and a conventional eccentric drive mechanism 84. The batt support blades 80 of each of the two escapement assemblies 78 are spaced apart from each other across the width of the staging station 24 and are affixed to the support blade cross member 82. The crank arms and drive linkage of the eccentric drive mechanisms 84 reciprocate the support blade cross members 82 and the batt support blades 80 of the escapements between a retracted position (shown in FIG. 2) where the batt support blades 80 are withdrawn from the staging station 24 and an extended position (shown in FIG. 1) where the batt support blades 80 extend into the staging station 24 to support one or more insulation batts 34 as a stack of insulation batts is being formed. In the embodiment shown, the batt support blades 80 of each of the escapement assemblies 78 are guided by and pass between upper and lower guide members (not shown) that extend transversely across the width of the station so that the batt support blades 80 move in a generally horizontal direction between their retracted and extended positions. However, it is also contemplated that the batt support blades 80 could be mounted on and moved between the extended and retracted positions by a drive with parallel linkage that moves the batt support blades 80 inward and upward when the blades are being extended to the extended position from the retracted position and outward and downward when the batt support blades are being withdrawn from the extended position to the retracted position.

Figure 6:
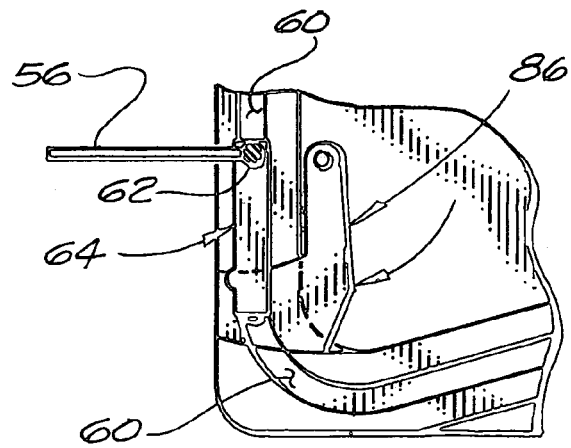
FIGS. 6 and 7 are schematic side elevation views of a portion of the continuous cam track of FIG. 4 to better show the mechanism for withdrawing the batt engaging blades of the apparatus from beneath an insulation batt in the staging station of the apparatus so that a stack of insulation batts can be moved down through the staging station into a packaging station located beneath the staging station.
Figure 7:
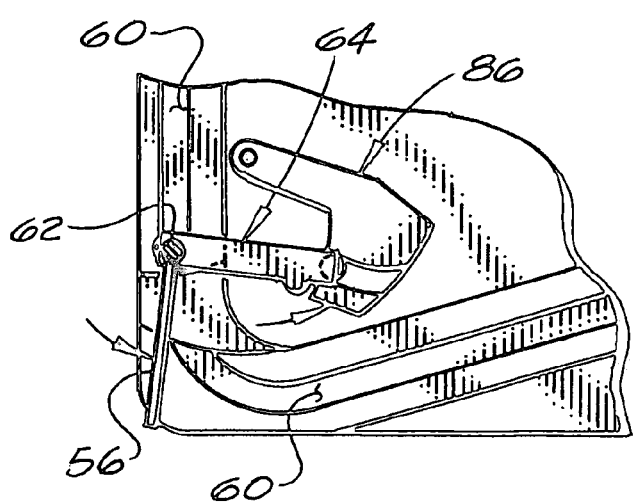

As shown in FIGS. 4, 6, and 7, the first endless cam track 60 of the first endless conveyor assembly 30 has a pivotal track segment assembly 86 adjacent a lower end of the vertical run of the first endless conveyor assembly that is angularly displaceable between a first position (shown in FIGS. 4 and 6) where the pivotal track segment assembly 86 forms a continuous portion of the first endless cam track 60 and a second angularly displaced position (shown in FIG. 7) where a lower end of the pivotal track segment assembly 86 is angularly displaced from the first endless cam track 60. With this structure, when the leading cam track follower 66 of the first cam member 64 of any of the cross member support rods 62 is located in the first endless cam track 60 in the vertical run of the first endless conveyor assembly 30 above the pivotal track segment assembly 86 of the first endless cam track 60 and the trailing cam track follower 68 of that first cam member 64 is located in the pivotal track segment assembly 86 of the first endless cam track 60 as shown in FIG. 6 and the pivotal track segment assembly 86 is angularly displaced to its angularly displaced position shown in FIG. 7, the batt engaging blades 56 mounted on that cross member support rod 62 are angularly displaced downward from the substantially horizontally extending orientation of FIG. 6 to the substantially vertically extending orientation of FIG. 7. This angular movement of the sets of batt engaging blades 56 by the pivotal track segment assembly 86 is utilized to move the sets of batt engaging blades out of the way when a stack 36 of insulation batts 34 is being loaded from the staging and up-stacking stations into the packaging station 28.

Figure 8:
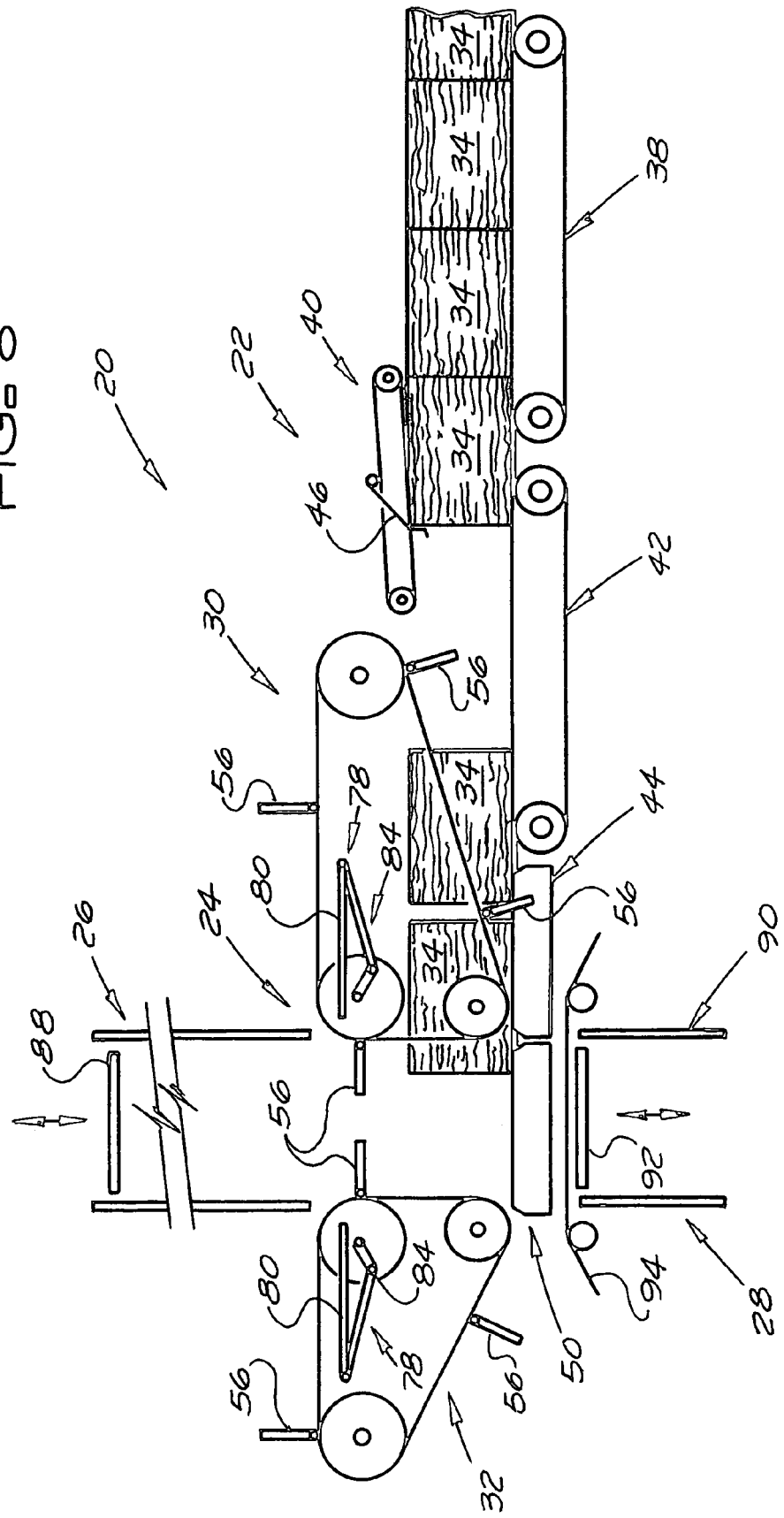
FIGS. 8 to 14 schematically show an insulation batt-packaging machine of the subject invention utilizing the apparatus and method of the subject invention to load a packaging station of the insulation batt-packaging machine with a stack of insulation batts at various stages of the insulation batt up-stacking operation and the delivery of the stack of insulation batts formed in the up-stacking operation into the packaging station.

The method of utilizing the apparatus of the subject invention to load the packaging station 28 of a packaging machine 20 of the subject invention will now be described in connection with FIGS. 8 to 14. In the method of the subject invention, insulation batts 34 are fed from a production line (not shown) into the infeed station 22 of the packaging machine 20 by a conveyor 38. In the infeed station 22, the modulator gate assembly 40 periodically feeds the insulation batts 34, one at a time, from the infeed conveyor 38 onto the infeed conveyor 42, which conveys the insulation batt to the slideway 44. The metering of the insulation batts 34 by the modulator gate assembly 40 onto the infeed conveyor 42 for conveyance by the infeed conveyor 42 to the slideway 44 is coordinated with the movement of the sets of batt engaging blades 56 on the infeed run of the first lateral endless conveyor assembly 30 so that the insulation batts are delivered to the slideway one at a time and between successive sets of the batt engaging blades 56. At the slideway 44, each insulation batt 34 conveyed to the slideway by the infeed conveyor 42 is engaged by the next set of batt engaging blades 56 of the first endless conveyor assembly 30 and moved over the slideway 44 and onto the staging platform 50 of the staging station 24 by the first lateral endless conveyor assembly 30. As shown in FIG. 8, an insulation batt 34 is being engaged on a rear surface and conveyed by a set of the batt engaging blades 56 of the first endless conveyor assembly 30 from the slideway 44 of the infeed station 22 onto the staging platform 50 of the staging station 24; after being released by the modulator gate assembly 40 of the infeed station 22 an insulation batt 34 has been conveyed by the endless infeed conveyor 42 from the modulator gate assembly to the slideway 44; and a series of insulation batts are being brought into the infeed station 22 from a production line (not shown) by the endless infeed conveyor 38 with an insulation batt 34 engaged by the modulator gate 46 of the modulator gate assembly.

Figure 9:
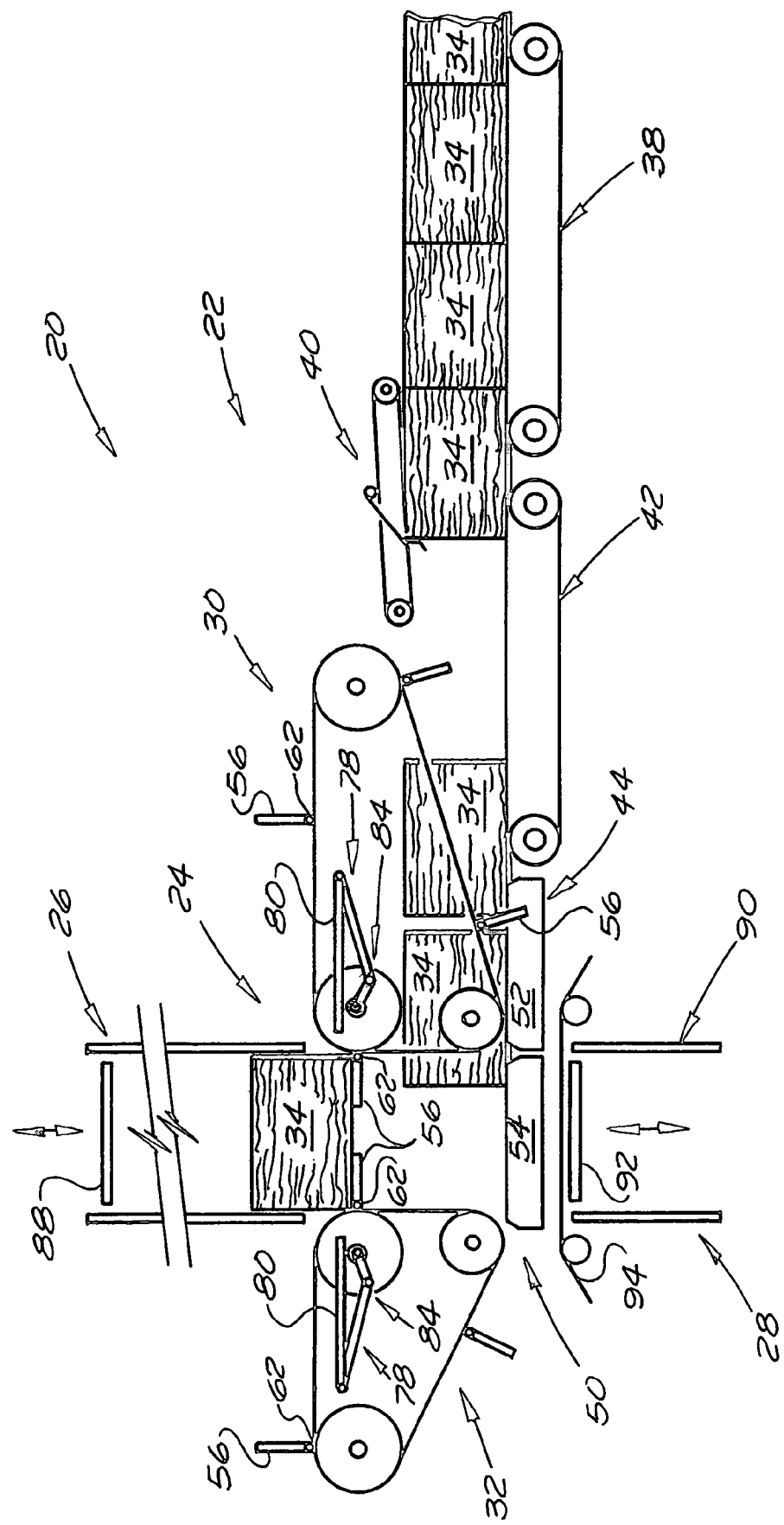

As an insulation batt 34 is moved across the slideway 44 and onto the staging platform 50 of the staging station 24 by a set of the batt engaging blades 56 of the first endless conveyor assembly 30, the set of batt engaging blades 56 passes between the vertically oriented slats 52 of the slideway 44 and the vertically oriented slats 54 of the staging platform 50. As the set of batt engaging blades 56 move from the lower infeed run of the first endless conveyor assembly 30 to the vertical run of the first endless conveyor assembly, the set of batt engaging blades 56 is angularly displaced about the longitudinal axis of the cross member support rod 62 on which the set of batt engaging blades is mounted and thereby moves from engagement with a rear surface of the insulation batt 34 to engagement with a bottom surface of the insulation batt 34. As the loading of this insulation batt 34 onto the staging platform 50 of the staging station 24 by the set of the batt engaging blades 56 of the first endless conveyor assembly 30 is being completed, a set of batt engaging blades 56 of the second endless conveyor assembly 32 is also passing between the vertically oriented slats 54 of the staging platform 50. As the set of batt engaging blades 56 of the second endless conveyor assembly 32 move from the lower run of the second endless conveyor assembly 32 to the vertical run of the second endless conveyor assembly, this set of batt engaging blades 56 is angularly displaced about the longitudinal axis of the cross member support rod 62 on which the set of batt engaging blades is mounted and thereby moves into engagement with the bottom surface of the insulation batt 34 at the same time the set of batt engaging blades 56 of the first endless conveyor assembly 30 moves into engagement with the bottom surface of the insulation batt 34. As these two sets of batt engaging blades 56 of the first and second endless conveyor assemblies 30 and 32 move upward along their vertical runs, these two sets of batt engaging blades cooperate to elevate the insulation batt from the staging station 24 into a vertically extending chamber of the up-stacking station 26. FIG. 9 shows the insulation batt 34 that was being loaded onto the staging platform 50 in FIG. 8, being elevated into the chamber of the up-stacking station 26 by these two sets of cooperating batt engaging blades 56 of the first and second endless conveyor assemblies 30 and 32. As this up-stacking operation is being carried out, the next insulation batt 34 is being loaded onto the staging platform 50 by the next successive set of batt engaging blades 56 of the first endless conveyor assembly 30 and following insulation batts are being metered into and conveyed through the infeed station 22 as described above in connection with FIG. 8.

Figure 10:
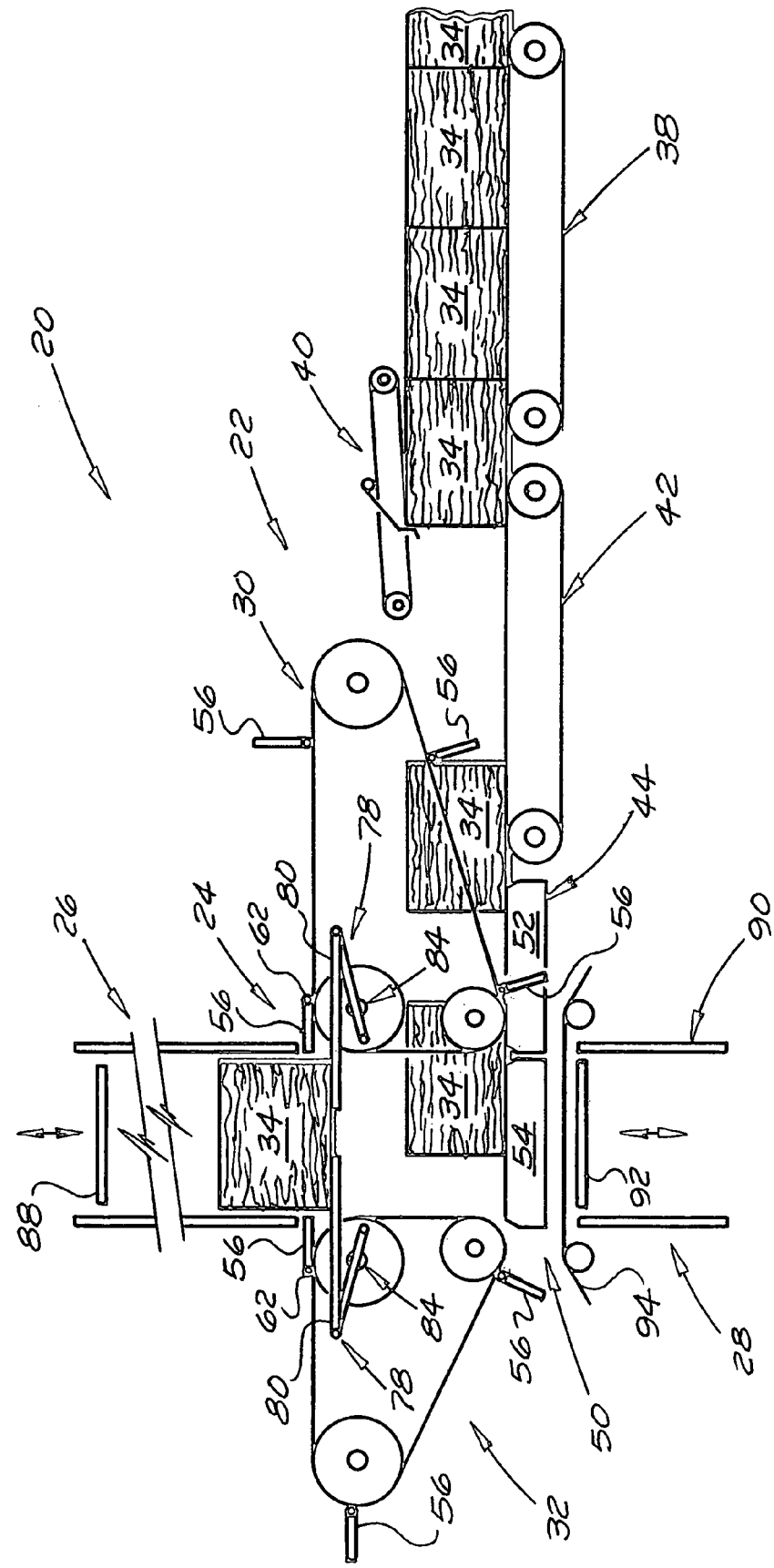

At the upper end of their vertical run, the sets of batt engaging blades 56 of the first and second endless conveyor assemblies 30 and 32 are withdrawn horizontally from the staging station as described above in connection with FIGS. 4 and 5. Simultaneously with the withdrawal of these sets of batt engaging blades 56, the batt support blades 80 of the escapement assemblies 78 are being moved from their retracted positions outside the staging station 24 to their extended positions within the staging station 24 so that the support of the insulation batt 34 just elevated by these sets of batt engaging blades 56 and any other insulation batts in the up-stacking station 26 is transferred to the batt support blades 80 of the escapement assemblies 78. FIG. 10 shows the insulation batt 34 just elevated immediately after the support of the insulation batt has been transferred to the batt supporting blades 80 escapement assemblies 78. As shown in FIG. 10 with the insulation batt 34 that has just been elevated and any other insulation batts 34 in the up-stacking station 26 supported by the escapement assemblies 78, these insulation batts 34 will not interfere with the loading of the next insulation batt 34 onto the staging platform 50.

Figure 11:
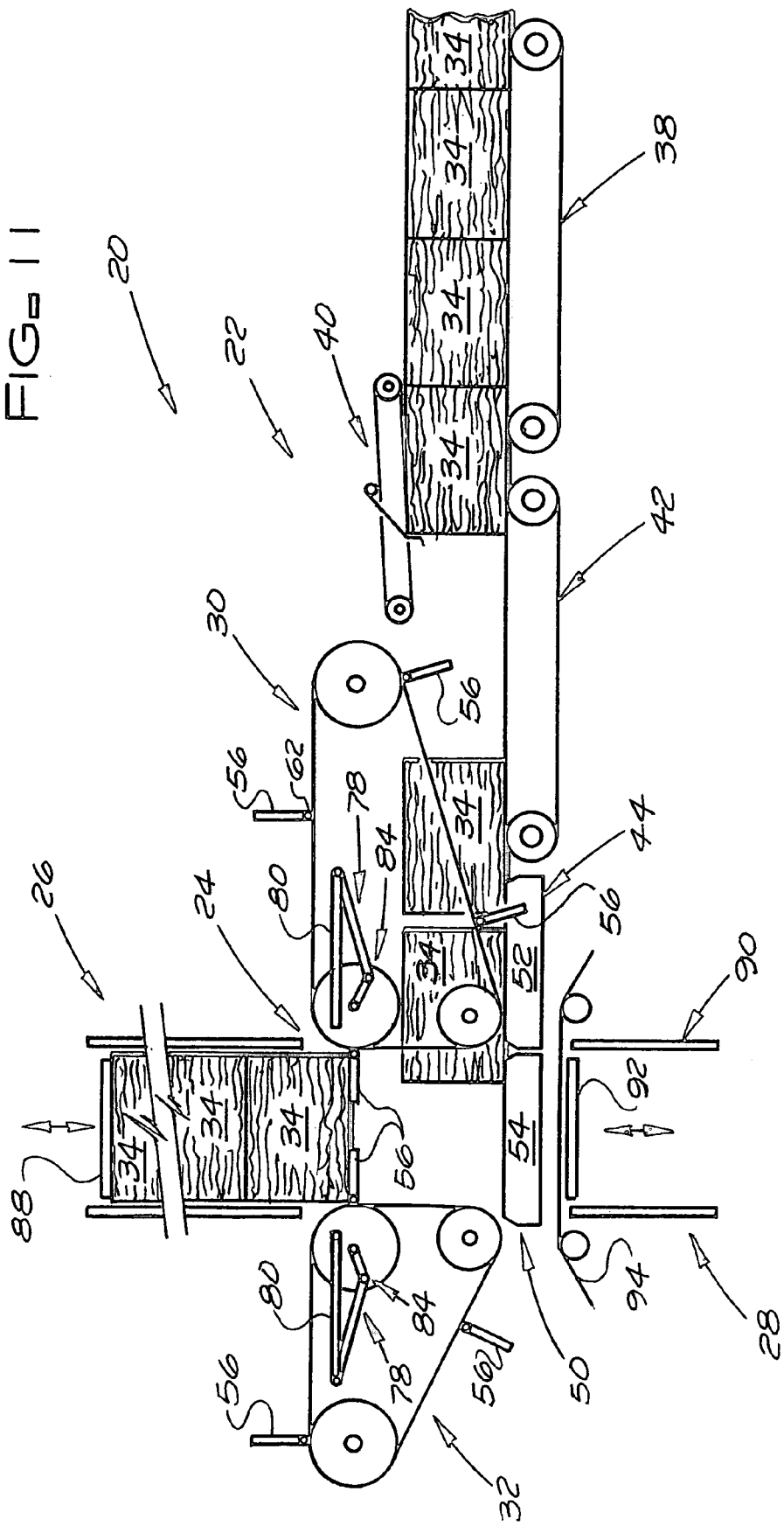
Figure 12:
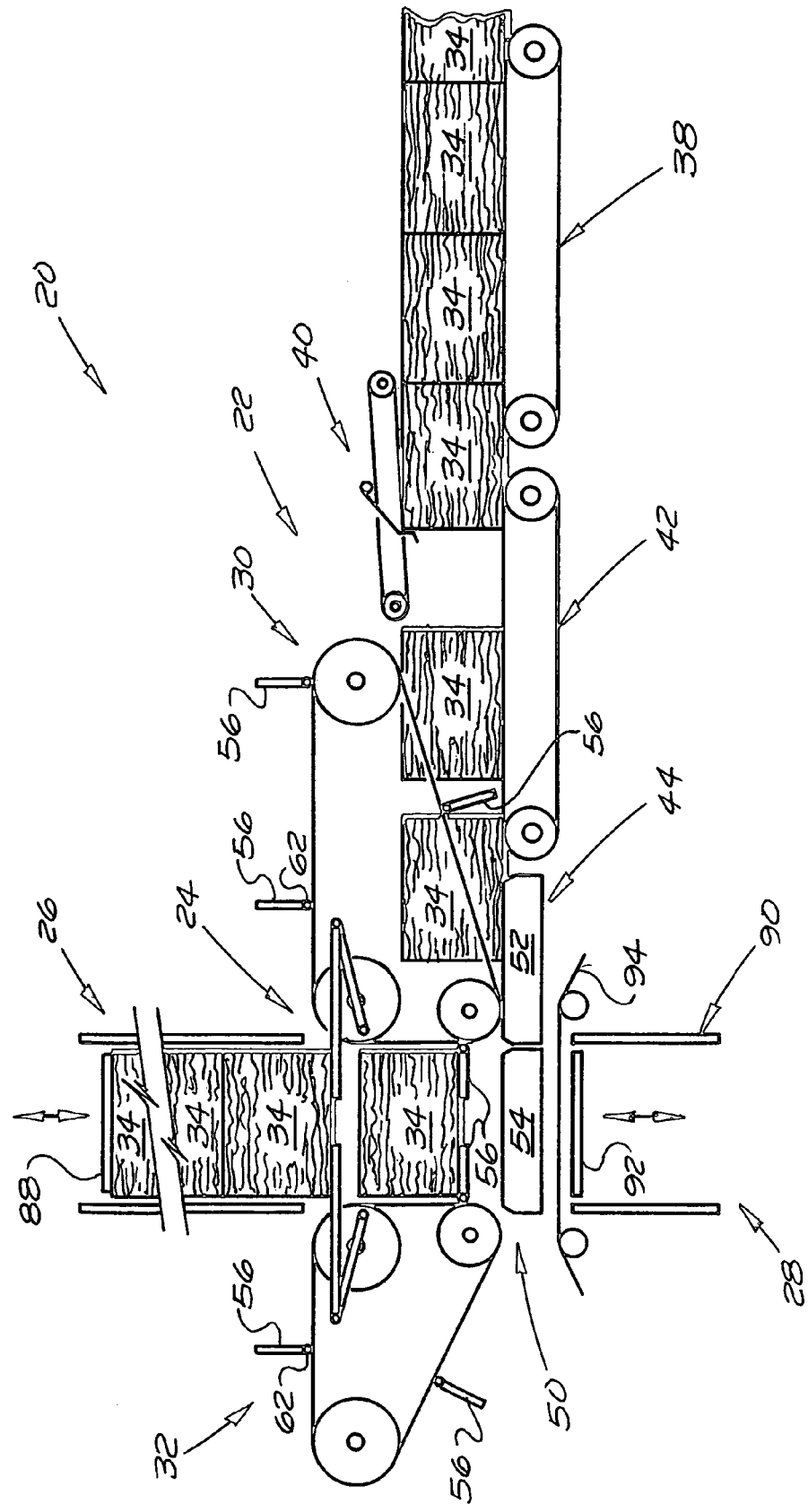
Figure 13:
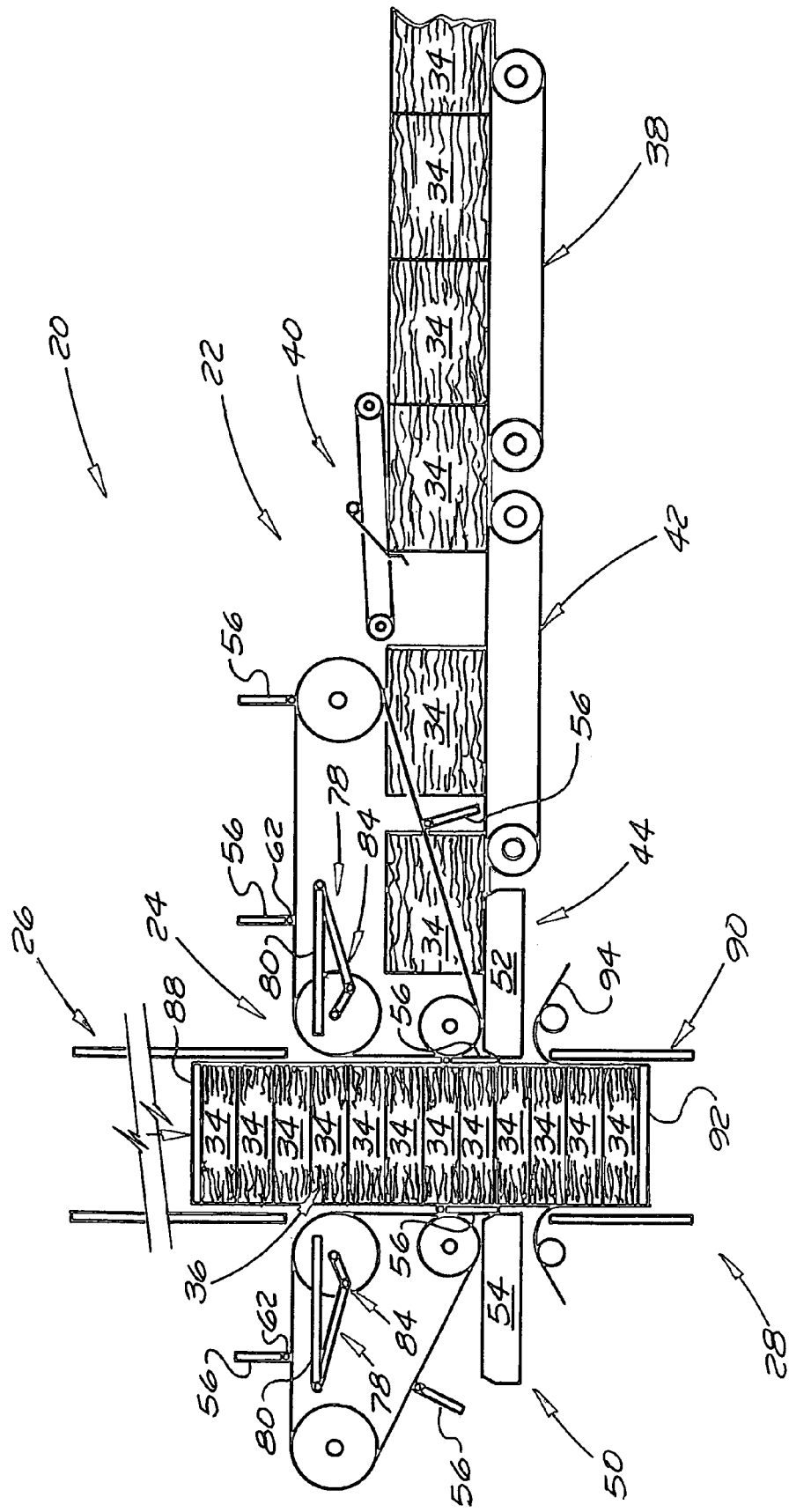

As shown in FIG. 11, which shows a number of insulation batts 34 in the up-stacking station 26, the up-stacking of insulation batts 34 into the chamber of the up-stacking station 26 continues. Once a preselected number of insulation batts 34, including an insulation batt 34 in the staging station 24, have been accumulated in the staging station 24 and the vertical chamber of up-stacking station 26 to form a stack 36 of insulation batts as shown in FIG. 12, the escapement assemblies 78 are automatically retracted and the loading of the stack 36 of insulation batts 34 from the staging and up-stating stations into packaging station 28 is ready to commence. In this loading operation, the staging platform 50 is withdrawn from the staging station 24 so that the bottom of the staging station 24 is open for the passage of the stack 36 of insulation batts from the staging and up-stacking stations into the packaging station. Simultaneously with the retraction of the staging platform 50 or immediately thereafter, the sets of batt engaging blades 56 supporting the insulation batt 34 currently in the staging station 24 and, with the retraction of the escapement assemblies 78, the batts 34 in the up-stacking station, are angularly displaced downward from their horizontal orientation shown in FIG. 12 to a vertical orientation (as described above in connection with FIGS. 6 and 7) to enable the stack 36 of insulation batts to be moved from the staging and up-stacking stations into the packaging station 28. When the stack 36 of insulation batts is driven from the up-stacking and staging stations 26 and 24 into the packaging station 28 by the compression plate 88, the infeed of the next insulation batt into the staging station 24 is momentarily stopped while the compression plate passes through the up-stacking and staging stations and the staging platform 50 is moved out of and back into the staging station. FIG. 13 shows, the infeed of insulation batts 34 into the staging station stopped and a stack 36 of insulation batts in the process of being driven from the staging and up-stacking stations into the packaging station by the compression plate 88. Once the compression plate 88 has passed below the sets of batt engaging blades 56 in the staging station 24, these sets of batt engaging blades are returned to their generally horizontal orientation.

Figure 14:
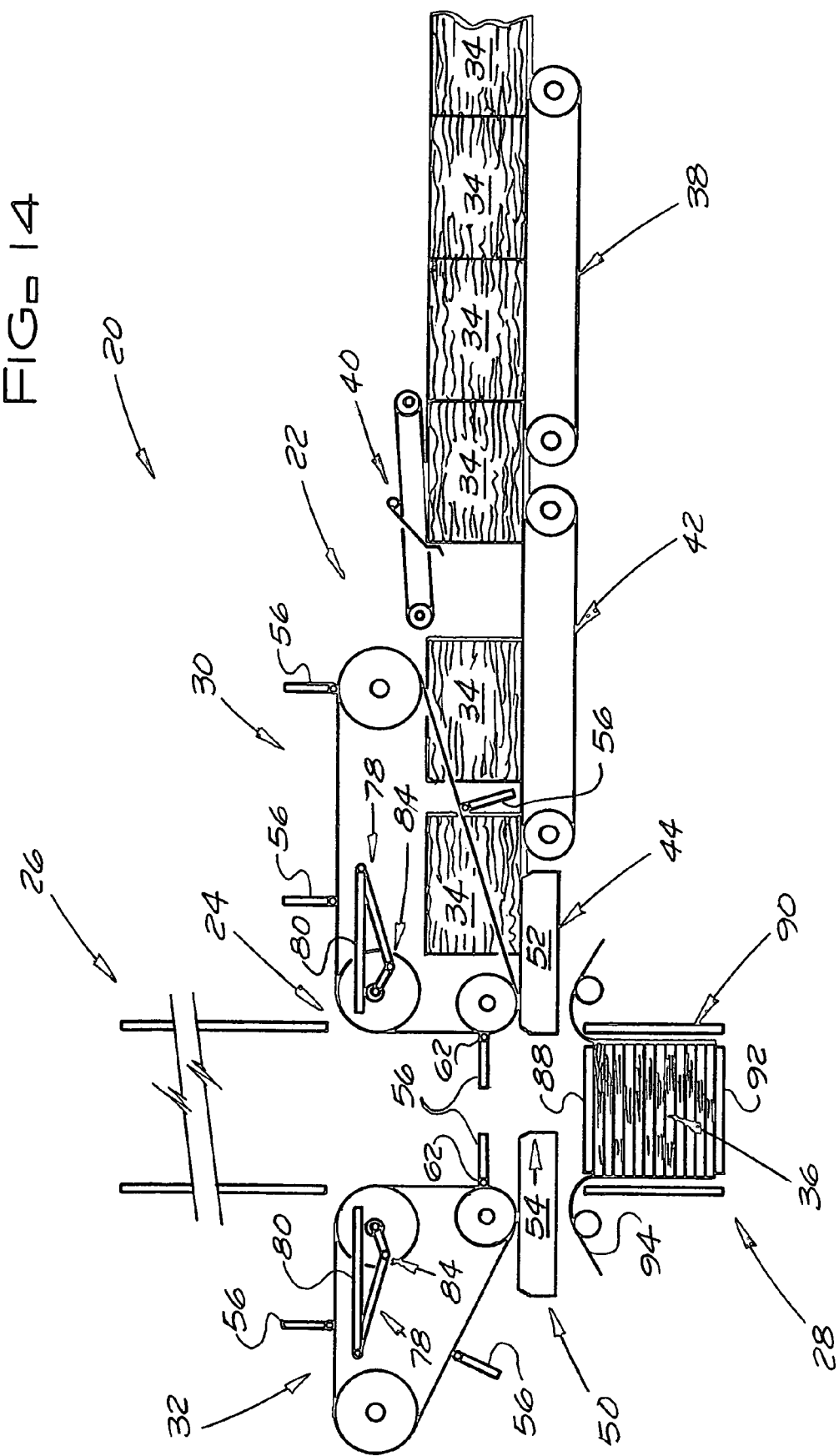

As the compression plate 88 passes below the staging station 24 into the packaging station 28, the staging platform 50 is moved back to its initial position to close the bottom of the staging station 24 and receive the next insulation batt 34 from the infeed station 22. FIG. 14 shows the compression plate 88 in the packaging station 28 and the staging platform moving back to its initial position to close the bottom of the staging station. As shown in FIGS. 13 and 14, the stack 36 of insulation batts are driven by the compression plate 88 into a hopper 90 of the packaging station 28 where the stack 36 of insulation batts is compressed between the compression plate 88 and a support plate 92 of the packaging station. As the stack of insulation batts is being compressed in the hopper 90, the compressed stack of insulation batts is being wrapped and packaged in a sheet 94 of packaging material. The packaging of the stack 36 of insulation batts in the packaging station 28 may be in accordance with the packaging operation described in columns 6 and 7 of U.S. Pat. No. 4,805,383 with reference to FIGS. 5 to 9 of U.S. Pat. No. 4,805,383 or other packaging operations wherein the stack 36 of compressed insulation batts is enclosed within a sleeve, bag or the like. After the stack 36 of insulation batts has been compressed and packaged in the packaging station 28, the compression plate is withdrawn from the packaging station hopper 90 and returned to the upper end of the up-stacking station 26 for the next packaging cycle and the packaging cycle just described in connection with FIGS. 8 to 14 is repeated.

It is contemplated that the use of the escapement assemblies 78 to support the insulation batts 34 in the up-stacking station 26 might be eliminated. This could be accomplished by adjusting the height of the vertical runs of the first and second endless conveyor assemblies 30 and 32 so that the loading of the next insulation batt 34 onto the staging platform 50 is already completed when the sets of batt engaging blades 56 of the first and second endless conveyor assemblies 30 and 32 are withdrawn at the top of their runs and no longer support the insulation batts in the up-stacking station. Once the insulation batts 34 in the up-stacking station 26 are no longer supported by the sets of batt engaging blades 56 being withdrawn from the staging station 24, the up-stacked insulation batts would drop onto the insulation batt 34 that has just been loaded onto the staging platform 50 of the staging station 24.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An apparatus for loading insulation batts into a packaging station of a batt-packaging machine; the insulation batts each having a length, a width, a thickness, top and bottom major surfaces defined by the length and width of the insulation batt, forward and rear lateral surfaces defined by the length and thickness of the insulation batt, and a longitudinal centerline; the apparatus comprising:

an up-stacking station, the up-stacking station comprising an up-stacking chamber for receiving a plurality of the insulation batts to form a vertical stack of the insulation batts;

a staging station from which the insulation batts are elevated into the up-stacking station of the batt-packaging machine; the staging station being sized and configured to successively accept the insulation batts therein; the staging station having first and second spaced apart opposing sides;

an infeed conveyor means on the first side of the staging station for receiving and successively conveying the insulation batts in a first direction toward the staging station with the insulation batts oriented to have their longitudinal centerlines extending in a direction transverse to the first direction in which the insulation batts are being conveyed by the infeed conveyor means;

a first endless conveyor means on the first side of the staging station; the first endless conveyor means having a lower batt infeed run, a substantially vertical run extending upward from the infeed run and forming the first side of the staging station, and an upper return run;

a second endless conveyor means on the second side of the staging station; the second endless conveyor means having a lower run, a substantially vertical run extending upward from the lower run and forming the second side of the staging station, and an upper return run; and the first and second endless conveyor means each having batt engaging means thereon for successively extending into the staging station from the first and second sides of the staging station, successively engaging the bottom major surfaces of the insulation batts as the insulation batts are successively fed into the staging station; and cooperating with each other as the batt engaging means move upwardly in the vertical runs of the first and second endless conveyor means to successively raise the insulation batts from the staging station into the up-stacking station of the batt-packaging machine.

2. The apparatus for loading insulation batts into a packaging station of a batt-packaging machine according to claim 1, wherein:

the infeed conveyor means and the first endless conveyor means are vertically aligned with each other; the infeed conveyor means has a batt infeed run; and the batt infeed run of the infeed conveyor means and the batt infeed run of the first endless conveyor means oppose each other, travel toward the staging station, and approach each other as the opposed batt infeed runs approach the staging station whereby, on the batt infeed run of the first endless conveyor means, the batt engaging means of the first endless conveyor means are successively brought into engagement with the rear lateral surfaces of the insulation batts being conveyed by the infeed conveyor means, to successively convey the insulation batts into the staging station, and subsequently brought into engagement with the bottom surfaces of the insulation batts once the insulation batts are in the staging station to raise the insulation batts, in cooperation with the batt engaging means of the second endless conveyor means, from the staging station into the up-stacking station of the batt-packaging machine.

3. The apparatus for loading insulation batts into a packaging station of a batt-packaging machine according to claim 2, wherein:

the batt infeed run of the infeed conveyor means is substantially horizontal and the lower batt infeed run of the first endless conveyor means is inclined to the horizontal to cause the batt infeed runs of the infeed conveyor means and first endless conveyor means to approach each other as the batt infeed runs approach the staging station.

4. The apparatus for loading insulation batts into a packaging station of a batt-packaging machine according to claim 2, wherein:

the staging station includes a staging platform of spaced apart slats onto which the insulation batts are successively fed by the batt engaging means of the first endless conveyor means; and the batt engaging means of the first and second endless conveyor means each include a series of batt engaging blade means that successively extend into the staging station from the first and second opposing sides of the staging station to successively engage the bottom major surfaces of the insulation batts in the staging station; and the batt engaging blade means are oriented relative to the slats of the staging platform to enable the batt engaging blade means to pass through the staging platform of the staging station to raise the insulation batts from the staging platform.

5. The apparatus for loading insulation batts into a packaging station of a batt-packaging machine according to claim 4, including:

retracting means for successively retracting each of the batt engaging blade means of the first and second endless conveyor means from beneath a lowermost of the insulation batts in the up-stacking station after the lowermost insulation batt in the up-stacking station has been raised by those batt engaging blade means of the first and second endless conveyor means into the up-stacking station of the packaging machine; and escapement means moveable between a first position for supporting the insulation batts that have been raised into the up-stacking station by the batt engaging blade means of the first and second endless conveyor means after each of the batt engaging blade means have been retracted from beneath the lowermost insulation batt of the insulation batts in the up-stacking station and keeping the insulation batts in the up-stacking station from descending onto a succeeding insulation batt of the insulation batts in the staging station until an introduction of the succeeding insulation batt into the staging station has been completed and a second retracted position which permits the insulation batts in the up-stacking station to descend onto the succeeding insulation batt of the insulation, batts after the succeeding insulation batt has been fully introduced into the staging station.

6. The apparatus for loading insulation batts into a packaging station of a batt-packaging machine according to claim 5, including:
control means:
for periodically and simultaneously stopping the first and second endless conveyor means when: a preselected number of the insulation batts have been raised into the up-stacking station, one of the cooperating series of the batt engaging blade means of the first endless conveyor means and one of the cooperating series of the batt engaging blade means of the second endless conveyor means are currently supporting one of the insulation batts in the staging station, the escapement means for supporting the insulation batts in the up-stacking station have been retracted to the second position to permit the insulation batts previously loaded into the up-stacking station to descend onto the insulation batt currently supported in the staging station;
for retracting the staging platform from the staging station while the first and second endless conveyor means are stopped; and
for retracting the cooperating batt engaging blade means of the first endless conveyor means and the cooperating batt engaging blade means of the second endless conveyor means that are currently supporting the succeeding insulation batt of the insulation batts in the staging station from beneath the insulation batt in the staging station while the first and second endless conveyor means are stopped so that the insulation batt in the staging station and the insulation batts from the up-stacking station can be delivered into a packaging station of the packaging machine for compression and packaging.

7. The apparatus for loading insulation batts into a packaging station of a batt-packaging machine according to claim 6, wherein:
the packaging station is located beneath the staging station; and
the apparatus includes a compression plate means for driving the insulation batt in the staging station and the insulation batts from the up-stacking station down through the staging station into the packaging station for packaging while the first and second endless conveyor means are stopped.

8. The apparatus for loading insulation batts into a packaging station of a batt-packaging machine according to claim 5, wherein:
the retracting means for successively retracting the cooperating batt engaging blade means of the first and second endless conveyor means from beneath a lowermost of the insulation batts in the up-stacking station after the lowermost insulation batt in the up-stacking station has been raised by the batt engaging means into the up-stacking station of the packaging machine retracts the cooperating batt engaging blade means in a generally horizontal direction from beneath the lowermost insulation batt of the insulation batts in the up-stacking station.

9. The apparatus for loading insulation batts into a packaging station of a batt-packaging machine according to claim 8, wherein:
the first endless conveyor means includes first and second lateral cam track means that define a path of travel for the first endless conveyor means; the first and second cam track means of the first endless conveyor means are spaced from each other in a second direction perpendicular to the first direction of travel of the insulation batts toward the staging station a distance greater than the lengths of the insulation batts whereby the insulation batts can be conveyed from the infeed conveyor means to the staging station by the first endless conveyor means with the longitudinal centerlines of the insulation batts oriented perpendicular to the first direction of travel;
each cooperating batt engaging blade means of the first endless conveyor means includes a plurality of the batt engaging blades that are spaced apart from each other in the second direction and mounted on a cross member means, which extends in the second direction between the cam track means, to be angularly displaced about a longitudinal axis of the cross member means along with the cross member means when there is an angular displacement of the cross member means about the longitudinal axis of the cross member means; and
the cross member means of each cooperating batt engaging blade means of the first endless conveyor means having a first cam means at a first end of the cross member means that is engaged with and travels in the first cam track means and a second cam means at a second end of the cross member means that is engaged with and travels in the second cam track means.

10. The apparatus for loading insulation batts into a packaging station of a batt-packaging machine according to claim 9, wherein:
the first cam means at the first end of the cross member means of each batt engaging blade means of the first endless conveyor means has a leading cam track follower and a trailing cam track follower that are each engaged with and travel in the first cam track means; the leading cam track follower of the first cam means of each cross member means of the first endless conveyor means is substantially axially aligned with the longitudinal axis of the cross member means and the trailing cam track follower of each cross member means of the first endless conveyor means is mounted on a radial arm and is radially spaced from the longitudinal axis of the cross member means;
the first cam track means of the first endless conveyor means diverges from a single track into upper and lower spaced apart track segments adjacent an upper end of the vertical run of the first endless conveyor means and converges in the upper return run of the first endless conveyor means back into the single track;
the leading cam track follower of the first cam means of each cross member means of the first endless conveyor means travels in the upper track segment of the first cam track means and the trailing cam track follower of the first cam means of each cross member means of the first endless conveyor means travels in the lower track segment of the first cam track means;

the second cam means at the second end of the cross member means of each batt engaging blade means of the first endless conveyor means has a leading cam track follower and a trailing cam track follower that are each engaged with and travel in the second cam track means; the leading cam track follower of the second cam means of each cross member means of the first endless conveyor means is substantially axially aligned with the longitudinal axis of the cross member means and the trailing cam track follower of the second cam means of each cross member means of the first endless conveyor means is mounted on a radial arm and radially spaced from the longitudinal axis of the cross member means;

the second cam track means of the first endless conveyor means diverges from a single track into upper and lower spaced apart track segments adjacent an upper end of the vertical run of the first endless conveyor means and converges in the upper return run of the first endless conveyor means back into the single track;

the leading cam track follower of the second cam means of each cross member means of the first endless conveyor means travels in the upper track segment of the second cam track means and the trailing cam track follower of the second cam means of each cross member means of the first endless conveyor means travels in the lower track segment of the second track means; and the upper and lower track segments of the first and second cam track means of the first endless conveyor means cooperate with the leading and trailing cam track followers of the first and second cam means of each cross member means of the first endless conveyor means, as the leading and trailing cam track followers of the first and second cam means of each cross member means of the first endless conveyor means travel through the upper and lower track segments, to angularly displace each cross member means of the first endless conveyor means about the longitudinal axis of the cross member means and angularly displace the batt engaging blades mounted on the cross member means about the longitudinal axis of the cross member means and retract the batt engaging blades mounted on the cross member means in a generally horizontal direction from beneath the lowermost insulation batt in the up-stacking station to thereby form the retracting means of the first endless conveyor means.

11. The apparatus for loading insulation batts into a packaging station of a batt-packaging machine according to claim 10, wherein:

the second endless conveyor means includes first and second lateral cam track means that define a path of travel for the second endless conveyor means; the first and second cam track means of the second endless conveyor means are spaced from each other in a second direction perpendicular to the first direction of travel of the insulation batts toward the staging station;

each cooperating batt engaging blade means of the second endless conveyor means includes a plurality of the batt engaging blades that are spaced apart from each other in the second direction and mounted on a cross member means, which extends in the second direction between the cam track means of the second endless conveyor means, to be angularly displaced about a longitudinal axis of the cross member means with the cross member means when there is an angular displacement of the cross member means about the longitudinal axis of the cross member means; and the cross member means of each cooperating batt engaging blade means of the second endless conveyor means having a first cam means at a first end of the cross member means that is engaged with and travels in the first cam track means of the second endless conveyor means and a second cam means at a second end of the cross member means that is engaged with and travels in the second cam track means of the second endless conveyor means.

12. The apparatus for loading insulation batts into a packaging station of a batt-packaging machine according to claim 11, wherein:

the first cam means at the first end of the cross member means of each batt engaging blade means of the second endless conveyor means has a leading cam track follower and a trailing cam track follower that are each engaged with and travel in the first cam track means of the second endless conveyor means; the leading cam track follower of the first cam means of each cross member means of the second endless conveyor means is substantially axially aligned with the longitudinal axis of the cross member means and the trailing cam track follower of each cross member means of the second endless conveyor means is mounted on a radial arm and is radially spaced from the longitudinal axis of the cross member means;

the first cam track means of the second endless conveyor means diverges from a single track into upper and lower spaced apart track segments adjacent an upper end of the vertical run of the second endless conveyor means and converges in the upper return run of the second endless conveyor means back into the single track;

the leading cam track follower of the first cam means of each cross member means of the second endless conveyor means travels in the upper track segment of the first cam track means and the trailing cam track follower of the first cam means of each cross member means of the second endless conveyor means travels in the lower track segment of the first cam track means;

the second cam means at the second end of the cross member means of each batt engaging blade means of the second endless conveyor means has a leading cam track follower and a trailing cam track follower that are each engaged with and travel in the second cam track means of the second endless conveyor means; the leading cam track follower of the second cam means of each cross member means of the second endless conveyor means is substantially axially aligned with the longitudinal axis of the cross member means and the trailing cam track follower of the second cam means of each cross member means of the second endless conveyor means is mounted on a radial arm and radially spaced from the longitudinal axis of the cross member means;

the second cam track means of the second endless conveyor means diverges from a single track into upper and lower spaced apart track segments adjacent an upper end of the vertical run of the second endless conveyor means and converges in the upper return run of the second endless conveyor means back into the single track;

the leading cam track follower of the second cam means of each cross member means of the second endless conveyor means travels in the upper track segment of the second cam track means and the trailing cam track follower of the second cam means of each cross member means of the second endless conveyor means travels in the lower track segment of the second track means; and the upper and lower track segments of the first and second cam track means of the second endless conveyor means cooperate with the leading and trailing cam track followers of the first and second cam means of each cross member means of the second endless conveyor means, as the leading and trailing cam track followers of the first and second cam means of each cross member means of the second endless conveyor means travel through the upper and lower track segments, to angularly displace each cross member means of the second endless conveyor means about the longitudinal axis of the cross member means and angularly displace the batt engaging blades mounted on the cross member means about the longitudinal axis of the cross member means and retract the batt engaging blades mounted on the cross member means in a generally horizontal direction from beneath the lowermost insulation batt in the up-stacking station to thereby form the retracting means of the second endless conveyor means.

13. The apparatus for loading insulation batts into a packaging station of a batt-packaging machine according to claim 12, wherein:

the first cam track means of the first endless conveyor means is continuous and has a pivotal track segment means adjacent a lower end of the vertical run of the first endless conveyor means that is angularly displaceable between a first position where the pivotal track segment means forms a continuous portion of the first cam track means of the first endless conveyor means and a second angularly displaced position where a lower end of the pivotal track segment means is angularly displaced from the first cam track means of the first endless conveyor means; the second cam track means of the first endless conveyor means is continuous and has a pivotal track segment means adjacent a lower end of the vertical run of the first endless conveyor means that is angularly displaceable between a first position where the pivotal track segment means forms a continuous portion of the second cam track means of the first endless conveyor means and a second angularly displaced position where a lower end of the pivotal track segment means is angularly displaced from the second cam track means of the first endless conveyor means; whereby when the leading cam track follower of the first cam means of the cross member means of any of the batt engaging blade means of the first endless conveyor means is located in the first cam track means in the vertical run of the first endless conveyor means above the pivotal track segment means of the first cam track means of the first endless conveyor means and the trailing cam track follower of that first cam means is located in the pivotal track segment means of the first cam track means of the first endless conveyor means and the leading cam track follower of the second cam means of the cross member means of that same batt engaging blade means of the first endless conveyor means is located in the second cam track means in the vertical run of the first endless conveyor means above the pivotal track segment means of the second cam track means of the first endless conveyor means and the trailing cam track follower of that second cam means is located in the pivotal track segment means of the second cam track means of the first endless conveyor means and the pivotal track segments of the first and the second cam track means of the first endless conveyor means are angularly displaced to their second angularly displaced positions, the batt engaging blades of that batt engaging blade means of the first endless conveyor means are angularly displaced downward from a substantially horizontally extending orientation to a substantially vertically extending orientation.

14. The apparatus for loading insulation batts into a packaging station of a batt-packaging machine according to claim 13, wherein:

the first cam track means of the second endless conveyor means is continuous and has a pivotal track segment means adjacent a lower end of the vertical run of the second endless conveyor means that is angularly displaceable between a first position where the pivotal track segment means forms a continuous portion of the first cam track means of the second endless conveyor means and a second angularly displaced position where a lower end of the pivotal track segment means is angularly displaced from the first cam track means of the second endless conveyor means; the second cam track means of the second endless conveyor means is continuous and has a pivotal track segment means adjacent a lower end of the vertical run of the second endless conveyor means that is angularly displaceable between a first position where the pivotal track segment means forms a continuous portion of the second cam track means of the second endless conveyor means and a second angularly displaced position where a lower end of the pivotal track segment means is angularly displaced from the second cam track means of the second endless conveyor means; whereby when the leading cam track follower of the first cam means of the cross member means of any of the batt engaging blade means of the second endless conveyor means is located in the first cam track means in the vertical run of the second endless conveyor means above the pivotal track segment means of the first cam track means of the second endless conveyor means and the trailing cam track follower of that first cam means is located in the pivotal track segment means of the first cam track means of the second endless conveyor means and the leading cam track follower of the second cam means of the cross member means of that same batt engaging blade means of the second endless conveyor means is located in the second cam track means in the vertical run of the second endless conveyor means above the pivotal track segment means of the second cam track means of the second endless conveyor means and the trailing cam track follower of that second cam means is located in the pivotal track segment means of the second cam track means of the second endless conveyor means and the pivotal track segments of the first and the second cam track means of the second endless conveyor means are angularly displaced to their second angularly displaced positions, the batt engaging blades of that batt engaging blade means of the second endless conveyor means are angularly displaced downward from a substantially horizontally extending orientation to a substantially vertically extending orientation.

15. The apparatus for loading insulation batts into a packaging station of a batt-packaging machine according to claim 14, including:

control means:

for periodically and simultaneously stopping the first and second endless conveyor means when: a preselected number of the insulation batts have been raised into the up-stacking station, first cooperating batt engaging blade means of the first and second endless conveyor means are supporting one of the insulation batts in the staging station, the escapement means for supporting the insulation batts in the up-stacking station have been retracted to permit the insulation batts previously loaded into the up-stacking station to descend onto the insulation batt supported in the staging station;

for retracting the staging platform from the staging station while the first and second endless conveyor means are stopped; and for retracting the first cooperating batt engaging blade means of the first and second endless conveyor means from beneath the insulation batt in the staging station while the first and second endless conveyor means are stopped by arcuately displacing the pivotal track segment means so that the insulation batt in the staging station and the insulation batts from the up-stacking station can be delivered into a packaging station of the packaging machine for compression and packaging.

16. The apparatus for loading batts into an up-stacking chamber of a batt-packaging machine according to claim 15, wherein:

the packaging station is located beneath the staging station; and the apparatus includes a compression plate means for driving the insulation batt in the staging station and the insulation batts from the up-stacking station down through the staging station into the packaging station for packaging while the first and second endless conveyor means are stopped.

* * * * *